(12) United States Patent
Engelmann et al.

(10) Patent No.: US 11,091,066 B2
(45) Date of Patent: Aug. 17, 2021

(54) BACKREST PART OF A VEHICLE SEAT HAVING AN UPPER SEATBACK ADJUSTMENT DEVICE

(71) Applicant: Volkswagen Aktiengesellschaft, Wolfsburg (DE)

(72) Inventors: Oliver Engelmann, Lehre (DE); Bjoern Zimmermann, Meine (DE); Tim Brueckner, Braunschweg (DE); Sven Rathmann, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/746,493

(22) Filed: Jan. 17, 2020

(65) Prior Publication Data

US 2020/0148078 A1    May 14, 2020

Related U.S. Application Data

(63) Continuation of application No. PCT/EP2018/069345, filed on Jul. 17, 2018.

(30) Foreign Application Priority Data

Jul. 18, 2017   (DE) .................... 10 2017 212 287.0

(51) Int. Cl.
  *B60N 2/22*    (2006.01)
  *B60N 2/90*    (2018.01)
  *B60N 2/02*    (2006.01)
  *B60N 2/427*   (2006.01)

(52) U.S. Cl.
  CPC ............ *B60N 2/22* (2013.01); *B60N 2/0232* (2013.01); *B60N 2/427* (2013.01); *B60N 2/914* (2018.02)

(58) Field of Classification Search
  CPC .............................. B60N 2/2222; B60N 2/643
  See application file for complete search history.

(56) References Cited

U.S. PATENT DOCUMENTS

| 4,715,653 | A  | 12/1987 | Hattori et al. |
| 5,927,804 | A  | 7/1999  | Cuevas |
| 6,398,299 | B1 * | 6/2002 | Angerer ................ B60N 2/888 |
|           |    |         | 297/216.12 |
| 6,866,339 | B2 | 3/2005  | Itoh |
| 6,918,633 | B2 | 7/2005  | Forkel et al. |
| 8,033,610 | B2 | 10/2011 | Graber et al. |
| 9,789,790 | B2 | 10/2017 | Kondrad et al. |

(Continued)

FOREIGN PATENT DOCUMENTS

| DE | 1 953 141     | 4/1971 |
| DE | 36 27 112 A1  | 3/1987 |

(Continued)

*Primary Examiner* — Timothy J Brindley
(74) *Attorney, Agent, or Firm* — Muncy, Geissler, Olds & Lowe, P.C.

(57) ABSTRACT

A backrest part for a vehicle seat having a seatback frame in which is arranged an upper seatback adjustment device that allows continuous adjustment in the upper region of the backrest part. Provision is made that the upper seatback adjustment device includes at least one surface element that is movably mounted in the seatback frame and at least one elastic impact absorber integrated into the at least one surface element, which are arranged so as to be jointly adjustable opposite to and in a direction of travel (+/-x-direction) with respect to the top section of the seatback frame.

15 Claims, 2 Drawing Sheets

(56) References Cited

U.S. PATENT DOCUMENTS

| | | | |
|---|---|---|---|
| 9,809,131 B2* | 11/2017 | Line | B60N 2/0232 |
| 9,889,773 B2* | 2/2018 | Line | B60N 2/68 |
| 10,166,887 B2* | 1/2019 | Damerow | B60N 2/2222 |
| 10,166,900 B2* | 1/2019 | Line | B60N 2/34 |
| 10,377,279 B2* | 8/2019 | Line | B60N 2/643 |
| 2005/0280296 A1* | 12/2005 | Ohchi | B60N 2/66 297/216.12 |
| 2010/0201167 A1* | 8/2010 | Wieclawski | B60N 2/2222 297/216.13 |
| 2013/0119723 A1 | 5/2013 | Nitsuma | |
| 2014/0203603 A1 | 7/2014 | Line et al. | |
| 2016/0121761 A1* | 5/2016 | Nishide | B60N 2/22 297/284.3 |
| 2018/0009339 A1* | 1/2018 | Durkee | B60N 2/2222 |
| 2018/0134181 A1* | 5/2018 | Ketels | B60N 2/2222 |
| 2018/0222357 A1* | 8/2018 | Mochizuki | B60N 2/682 |

FOREIGN PATENT DOCUMENTS

| | | | |
|---|---|---|---|
| DE | 199 00 368 A1 | 9/1999 | |
| DE | 100 22 441 A1 | 7/2001 | |
| DE | 101 29 721 A1 | 1/2003 | |
| DE | 101 45 206 A1 | 7/2005 | |
| DE | 601 10 998 T2 | 5/2006 | |
| DE | 10 2007 004 767 A1 | 8/2008 | |
| DE | 10 2012 015 344 A1 | 3/2013 | |
| DE | 11 2011 102 400 T5 | 8/2013 | |
| DE | 10 2013 015 529 A1 | 3/2015 | |
| DE | 10 2015 116 465 A1 | 4/2016 | |
| DE | 202019103027 U1 * | 6/2019 | B60N 2/0252 |
| JP | H 06-72201 A | 3/1994 | |
| JP | H 06-90836 A | 4/1994 | |
| WO | WO 2008/092556 A1 | 8/2008 | |
| WO | WO-2015049937 A1 * | 4/2015 | B60N 2/2222 |

\* cited by examiner

BACKREST PART OF A VEHICLE SEAT HAVING AN UPPER SEATBACK ADJUSTMENT DEVICE

This nonprovisional application is a continuation of International Application No. PCT/EP2018/069345, which was filed on Jul. 17, 2018, and which claims priority to German Patent Application No. 10 2017 212 287.0, which was filed in Germany on Jul. 18, 2017, and which are both herein incorporated by reference.

BACKGROUND OF THE INVENTION

Field of the Invention

The present invention relates to a backrest part for a vehicle seat having a seatback frame in which an upper seatback adjustment device is arranged.

Description of the Background Art

The document DE 11 2011 102 400 T5, which corresponds to U.S. 2013/0119723 discloses a vehicle seat that enables effective reduction of an impact on the body, the cervical region, of an occupant in the event of a rear end collision. The vehicle seat includes a seatback frame that contains side frames located on sides hereof, a pressure receiving member coupled to the seatback frame by coupling members to support an occupant, and an impact reduction member arranged on at least one of the side frames and coupled to the coupling members. The result is achieved that the pressure receiving member moves rearward by a predetermined amount of impact load that acts on the pressure receiving member, wherein the seatback frame contains a lumbar-sinking preventing member that prevents a movement such that the lumbar zone of the occupant sinks rearward.

The document DE 100 22 441 A1 describes a backrest for a vehicle seat, with a seatback frame and a headrest that has a headrest cushion and a cushion support supporting the headrest cushion, and also with a device for forward displacement of the headrest that can be activated in the event of a rear-end collision. The device for forward displacement of the headrest in the event of a rear-end collision has a mount, which is pivotable about at least one transverse pivot axis, with an impact-absorbing element. The mount serves to accommodate the cushion support in a height-adjustable manner. The impact-absorbing element is arranged within the seatback frame such that it experiences a pivoting directed toward the rear into the depth of the backrest due to the body of a seat user in the event of a rear-end collision, thereby causing the mount to pivot forward, by which means the headrest cushion is brought toward the seat user's head.

Reference is made in addition to the documents DE 10 2013 015 529 A1, WO 2008/092556 A1, and DE 10 2012 015 344 A1, which each disclose a tilt-adjustable upper seatback.

SUMMARY OF THE INVENTION

It is therefore an object of the present invention to provide an adjusting device by means of which it is possible to adjust the structure of the vehicle seat to the body of a person sitting on the vehicle seat.

The starting point of the invention is a backrest part for a vehicle seat having a seatback frame in which is arranged an upper seatback adjustment device that allows continuous adjustment in the upper region of the backrest part.

Provision is made that the upper seatback adjustment device can include at least one surface element that is movably mounted in the seatback frame and at least one elastic impact absorber integrated into the at least one surface element, which are arranged so as to be jointly adjustable opposite to and in the direction of travel with respect to the top section of the seatback frame.

For example, provision is made that the at least one movable surface element is mounted in mounting points in the seatback frame in such a manner that a translational motion of the at least one movable surface element and of the at least one integrated elastic impact absorber can be achieved opposite to and in a direction of travel.

The at least one movable surface element can be mounted in mounting points in the seatback frame in such a manner that a rotational motion of the at least one movable surface element and of the at least one integrated elastic impact absorber about a horizontal pivot axis can be achieved opposite to and in a direction of travel.

The above-stated can be implemented in combination with one another so that a joint translational or a rotational adjustment of the elements takes place as desired.

Preferably, provision is made with regard to the rotational adjustment that the horizontal pivot axis can be located at the bottom edge of the at least one movable surface element. The advantage of this measure is explained in the description.

The at least one movable surface element can form a contact surface that can be brought toward the shoulder region of a back surface of a back region of a seated person by the continuous adjustment of the at least one movable surface element opposite the direction of travel.

The at least one elastic impact absorber can form a contact surface that can be brought toward a neck and the upper back surface of the back region of the seated person by the continuous adjustment of the at least one movable surface element opposite the direction of travel.

Provision can also be made that movably mounted surface elements can be arranged relative to a vertical longitudinal center axis of the backrest part to be axially symmetrical on the left and right of the longitudinal center axis.

The at least one movable surface element and the at least one elastic impact absorber can be arranged in a common surface-element-and-impact plane.

The elastic impact absorber can be a wire mesh mat of flat design that forms the impact plane and can be composed of multiple serpentine wires that advantageously have a desired elasticity.

The wire mesh mat can be integrated into the at least one movable surface element in a suitable manner. For example, the wire mesh mat can be arranged to be integrated between two movable surface elements.

The movable surface elements can be connected by rocker arms to a connecting element that is arranged in a connecting element plane parallel to the elastic impact absorber in the impact absorber plane between the top section and the impact absorber.

The invention additionally includes a solution that permits an adjustment opposite to and in a direction of travel that is accomplished mechanically or electromechanically or pneumatically by means of at least one adjuster that is associated with the upper seatback adjustment device and that acts on the at least one movable surface element and/or the connecting element, as is described in detail below in the description.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

For the purposes of the description, the direction located in the vehicle's longitudinal direction is labeled "x." The direction in the horizontal plane of the vehicle perpendicular to the x-direction is labeled "y," and the direction in the vertical plane of the vehicle perpendicular to the x-direction is labeled "z." This system of notation for the spatial directions in Cartesian coordinates corresponds to the coordinate system generally used in the automotive industry.

Figure 1:
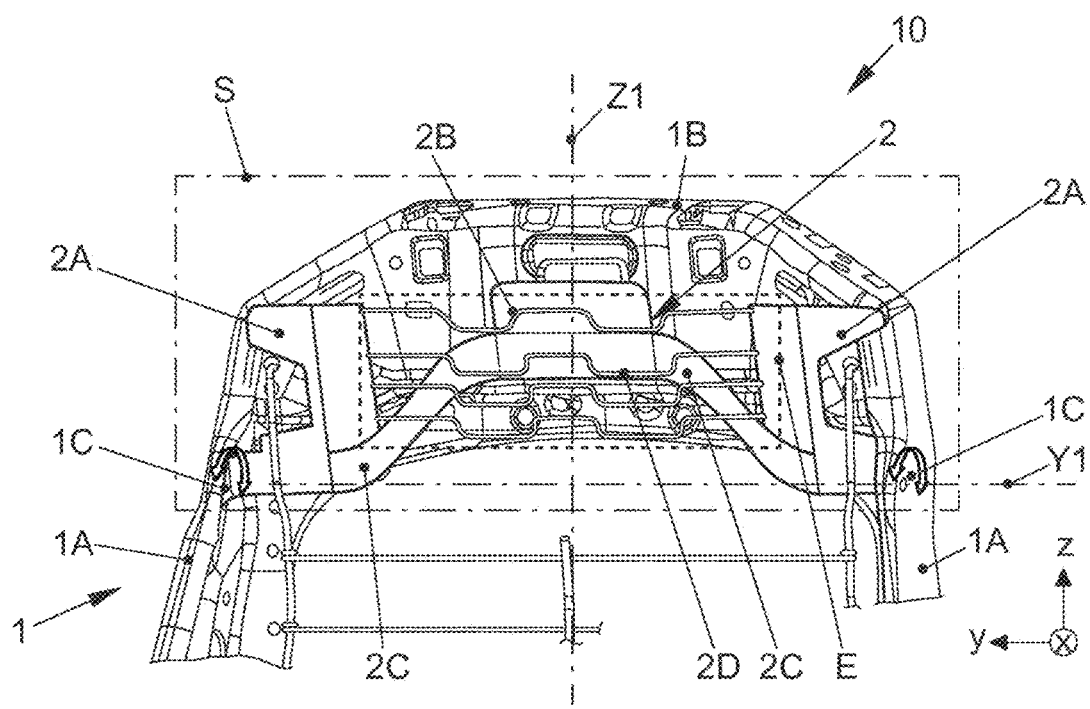
FIG. 1 shows a perspective front view of an upper seatback adjustment device in the seatback frame of a backrest part.
Figure 2:
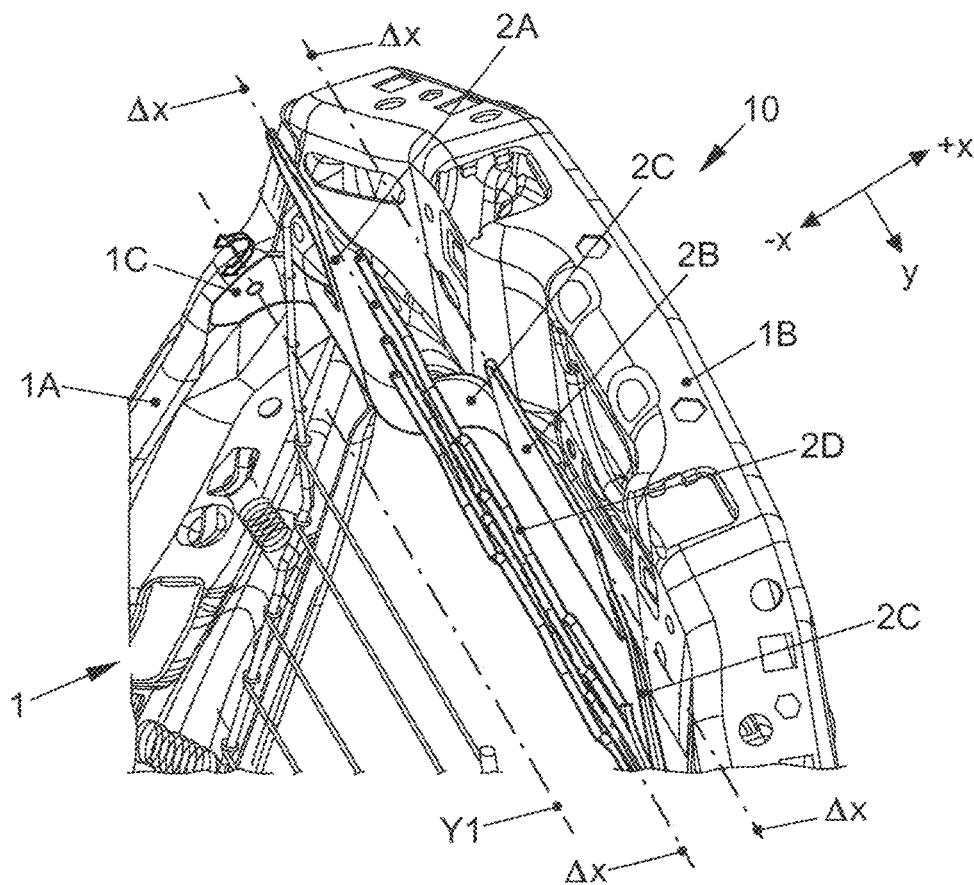
FIG. 2 shows a perspective view, obliquely from above, of the upper seatback adjustment device in the seatback frame of the backrest part.

FIGS. 1 and 2 show an overview of a backrest part 10 of a vehicle seat in a perspective front view and in a perspective view obliquely from above.

In a known manner, the backrest part 10 includes side members 1A and a top section 1B, in particular a top panel section, which together form the upper part of a seatback frame 1.

Arranged in the top panel section 1B is a headrest that is routinely adjustable by Δx at least in and opposite to the direction of travel x.

A headrest face forms the contact surface in this design for the back of the head of the person sitting on the vehicle seat.

When the seated person is in a normal sitting posture, in current vehicle seats there is a distance between a top panel face S and the upper backrest surface for the person sitting on the vehicle seat that cannot be changed in conventional vehicle seats.

The top panel face S is defined as the upper region of the backrest face, which is formed by the foam arranged on the seatback frame 1, which foam is located outside the support surface of the backrest surface for the seated person so that a distance is created between the person's shoulder and upper back regions and the top panel face when the unadjusted upper seatback adjustment device 2 is in the initial position and the seated person is in a normal sitting position.

For clarification, the top panel face S is provided with a dash-dotted frame in FIG. 1.

According to the invention, an upper seatback adjustment device 2 is formed in the region of the top panel face S.

The upper seatback adjustment device 2 is arranged inside the foam of the backrest part 10. In this design, the foam of the backrest part 10 is implemented on the side facing the seated person in such a manner that the foam arranged on the upper seatback adjustment device 2 can be moved relative to the adjacent foam. Provision can be made here that the foam part of the backrest part 10 is multipart, or that the foam part of the upper seatback adjustment device 2 of the backrest part 10 is arranged to be movable relative to the adjacent foam in a suitable manner.

In an initial position, the top panel face S—formed by the foam of the backrest part—of the upper seatback adjustment device 2 is located, for example, in the y-z headrest plane (see FIG. 1) of the headrest face.

According to the invention, an upper seatback adjustment device 2 is provided that permits a reversible adjustment of the top panel face S relative to the headrest face in the +/−x-direction=Δx.

As a result, the positioning of the upper back region of the seated person and the positioning of the seated person's head can advantageously be accomplished with the aid of the upper seatback adjustment device 2.

The positioning of the seated person's head can also be accomplished with the aid of the headrest adjustment device in the +/−x-direction=Δx.

According to the invention, the possibility exists that the headrest adjustment device can be omitted in the design of the upper seatback adjustment device 2.

In summary, it is advantageously possible by means of the upper seatback adjustment device 2 to reversibly and continuously adjust the top panel face S by Δx relative to the headrest face.

By adjusting the upper seatback adjustment device 2, the previously existing distance between the seated person's shoulder and upper back regions and the top panel face S provided with foam can be reduced or eliminated as soon as an adjustment of the upper seatback adjustment device 2 takes place in the −x-direction (see FIG. 2), as will be explained more fully below.

The upper seatback adjustment device labeled as a whole with the reference number 2 includes at least one—two in the exemplary embodiment—nonelastic, movable surface element(s) 2A that is/are movably mounted in the side members 1A.

The element or elements is/are called "surface" elements because it forms/they form at least one support surface within the upper seatback adjustment device 2 for a back surface of a seated person including the shoulder surfaces, as will be made clear in the description.

When a single surface element is implemented in the region of the top panel face S, the distance from the surface element of the shoulder and upper back regions of a person sitting in a normal position can, as already mentioned, be reduced or eliminated as soon as an adjustment of the two surface element takes place in the −x-direction.

Figure 3:
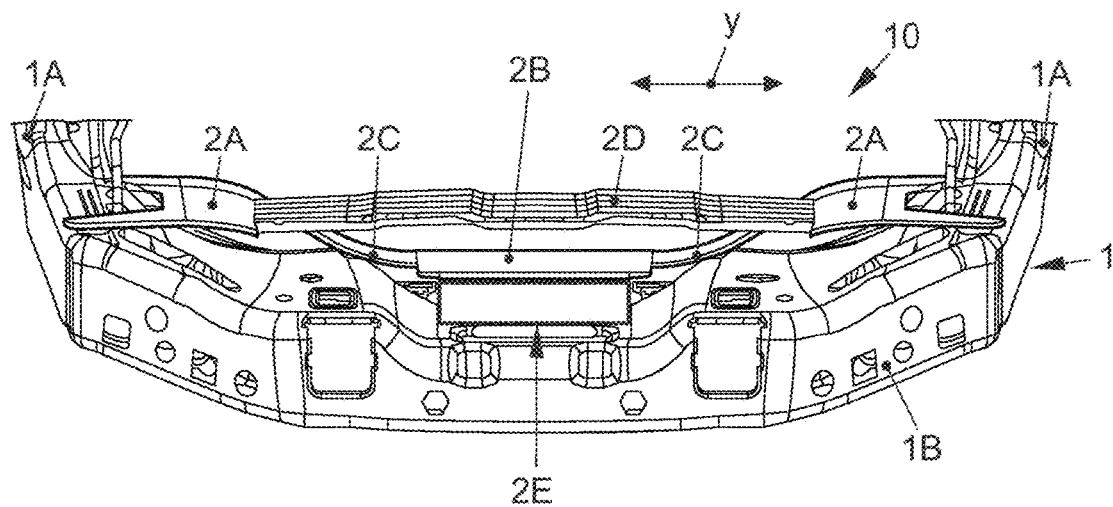
FIG. 3 shows a perspective view from above of the seatback frame and the upper seatback adjustment device of the backrest part.
Figure 4:
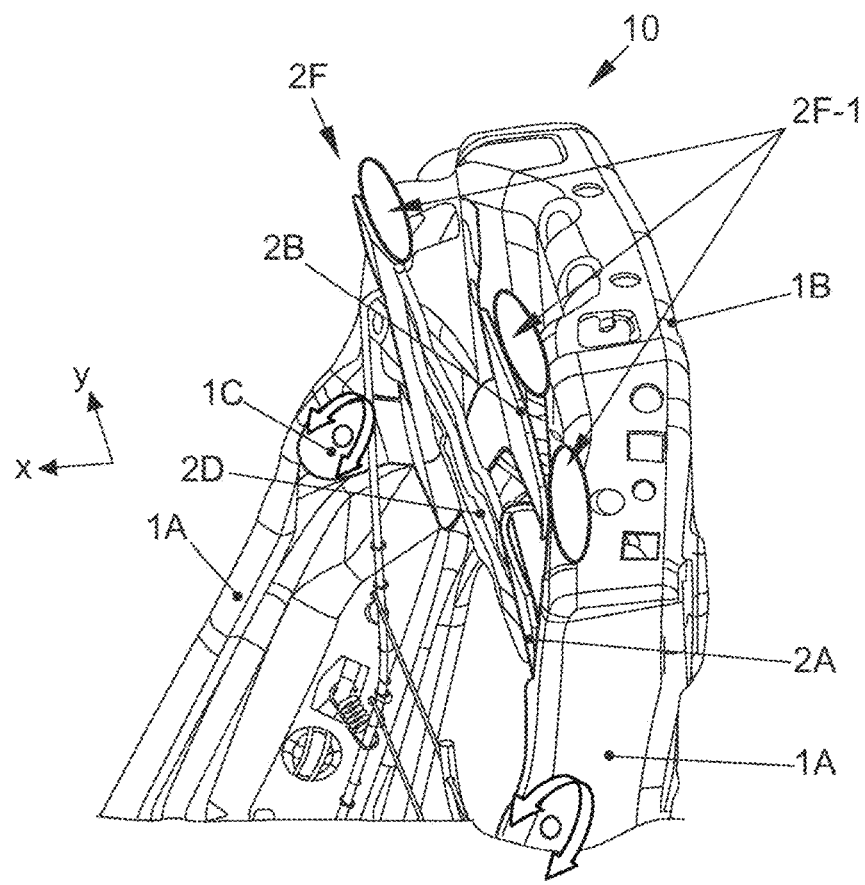
FIG. 4 shows a perspective view, obliquely from above, of the seatback frame and the upper seatback adjustment device of the backrest part.

When the two lateral surface elements 2A shown in FIGS. 1 and 2, as well as the subsequent FIGS. 3 and 4, are implemented, as already explained, the distance of the shoulder and upper back regions of the person sitting in the normal position from the two surface elements 2A can be reduced or eliminated as soon as an adjustment of the two surface elements 2A takes place in the −x-direction.

The two lateral surface elements 2A are arranged relative to the vertical longitudinal center axis Z1 of the backrest part 10 to be axially symmetrical on the left and right of the longitudinal center axis Z1, wherein the lateral surface elements 2A are movably mounted in mounting points 1C in one side member 1A apiece.

The surface element(s) 2A can be mounted in the mounting points 1C in such a manner that they are translationally displaceable, so to speak, in the +x-direction.

In the variant embodiment shown in the figures, provision is made that the surface element(s) 2A is/are displaceable about a horizontal pivot axis Y1 (see the double-headed arrows in FIGS. 1 and 3), hence are mounted in the mounting points 1C so as to be reversibly rotatable.

In this case, provision is made according to the invention that the horizontal pivot axis Y1 is arranged at the bottom edge of the surface element(s) 2A so that the upper seatback adjustment device 2 executes a pivoting motion in which the surface element(s) 2A bring(s) about a larger adjustment motion in the +/−x-direction in the upper region as compared to a lower region during the rotary motion of the upper seatback adjustment device 2. As a result, an ergonomically better adaptation of the top panel face S to the shoulder region or the upper back region of the seated person is advantageously achieved in the variant embodiment shown in the figures.

In the exemplary embodiment, the surface elements 2A are implemented as formed sheet metal parts. The two surface elements 2A arranged in the variant embodiment shown are preferably connected to one another by a connecting element 2B located outside the y-z surface element plane.

Viewed in the x-direction, the connecting element 2B is thus located between the y-z surface-element-and-impact plane of the installation space provided by the surface elements 2A and an impact absorber 2D and the top panel section 1B of the seatback frame 1.

The connecting element 2B preferably is likewise implemented as a flat formed sheet metal part.

The connecting element 2B in the exemplary embodiment is rigidly connected to the surface elements 2A by two rocker arms 2C, which span the horizontal distance in the x-direction between the connecting element 2B and the surface elements 2A. In other words, a motion of the connecting element 2B is transmitted to the surface elements 2A and vice versa, which is discussed below. The rocker arms 2C are likewise implemented as formed sheet metal parts.

Due to the horizontal reset of the connecting element 2B in the +x-direction relative to the surface elements 2A (see FIGS. 1 and 2, in particular) with the aid of the rocker arms 2C, it is possible according to the invention that a wire mesh mat is arranged as impact absorber 2D between the two surface elements 2A, the wires of which are preferably implemented in a serpentine shape.

The impact absorber 2D in the manner of a wire mesh mat spanned in a plane (y-z impact plane) likewise represents a "surface" element, since it forms a support surface within the upper seatback adjustment device 2 for a back surface and/or neck surface located between the shoulder regions of a seated person, as will be made clear in the description.

The wire mesh mat 2D arranged between the surface elements 2A is thus arranged in the y-z surface element plane of the surface elements 2A (as is most clearly evident in FIG. 1), and forms the y-z impact plane, which are located in the same plane.

In the event of a crash, in particular in the case of a rear-end collision, or in the event of a rebound of the occupants even in a front-end collision, a sink region E into the y-z impact plane is created for the neck and the upper back region between the shoulders of the seated occupant by the means that the surface elements 2A are connected to one another by the wire mesh mat 2D; this sink region is represented in FIG. 1 by a dotted frame.

Advantageously, as a result of this embodiment of the upper seatback adjustment device 2, the upper back region and, in particular, the neck of the occupant can sink backward into the impact region E, in particular the wire mesh mat region, in the event of an accident, wherein the shoulders of the occupant are advantageously supported at the same time by the surface elements 2A.

This upper seatback adjustment with the aid of the upper seatback adjustment device 2 therefore not only offers a comfort advantage due to the ergonomically more comfortable adaptation to the seated person, but also improves safety for the seated person because the forces of acceleration for the occupant's upper body and head are absorbed by the elastically deformable wire mesh mat 2D by means of the impact absorber implemented as wire mesh mat 2D so that both the upper body and the head of the occupant are decelerated, thus advantageously reducing the whiplash effect, in particular, of the occupant's head that otherwise is abruptly displaced relative to the occupant's upper body by the neck motion.

According to the invention, provision is made that the upper seatback adjustment device 2 is accomplished manually or electromechanically or pneumatically.

It is a matter of course that a multiplicity of embodiments can be designed for this purpose, wherein preferred embodiments are explained below.

Provision can also be made that at least one fitting or at least one lever or at least one rotary knob, which acts on the surface element(s) 2A and or the connecting element 2B and/or the rocker arms 2C in order to adjust the upper seatback adjustment device 2 in the +/−x-direction as explained, is installed on or in the seatback frame.

In the example shown in FIG. 3 (perspective top view of the seatback frame 1), provision is made to implement an electromechanical adjuster 2E that is arranged in an installation space between a back of the connecting element 2B and the front of the top panel section 1B. The adjuster 2E includes an adjusting element that can be adjusted in the +/−x-direction by an electric motor so that the connecting element 2B that is implemented as a connecting plate can be displaced in the +/−x-direction, since the adjusting element is connected to the connecting plate.

In FIG. 4 (perspective view, obliquely from above, of the seatback frame 1), provision is made to implement a pneumatic adjuster 2F. The pneumatic adjuster includes at least one pneumatic cushion 2F-1, which preferably is/are arranged between the surface element or elements 2A and/or the connecting element 2B implemented as a connecting plate and the top panel section 1B. The pneumatic cushions 2F-1 can be filled with a gaseous medium, in particular air, and can be evacuated. An adjustment of the upper seatback adjustment device 2 in the −x-direction is accomplished by a filling with air (see FIG. 2), wherein an evacuation permits a reset in the +x-direction, in that a return element, in particular return springs, are arranged between the connecting element 2B or the surface element or elements 2A, which accomplishes a movement of the upper seatback adjustment device 2 in the +x-direction.

Advantageously, with the solution according to the invention there is no need to design a new top panel section 1B. In other words, the upper seatback adjustment device 2 can be integrated into already existing seatback frames 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A backrest part for a vehicle seat comprising:
   a seatback frame; and
   an upper seatback adjustment device arranged in the seatback frame, the upper seatback adjustment device facilitating continuous adjustment in an upper region of the backrest part;
   the upper seatback adjustment device having at least one surface element that is movably mounted in the seatback frame and at least one elastic impact absorber integrated into the at least one surface element, the at least one surface element and the at least one elastic impact absorber being arranged so as to be jointly adjustable opposite to and in a direction of travel with respect to a top section of the seatback frame,
   wherein the at least one surface element and the at least one elastic impact absorber are arranged in a common surface-element-and-impact plane, and
   wherein the at least one surface element is mounted directly to the seatback frame by mounting points, the mounting points corresponding to and being provided on a horizontal pivot axis of the at least one surface element.

2. The backrest part according to claim 1, wherein the at least one surface element is mounted in the mounting points in the seatback frame such that a translational motion of the at least one surface element and of the at least one elastic impact absorber is achieved opposite to and in the direction of travel.

3. The backrest part according to claim 1, wherein the at least one surface element is mounted in the mounting points in the seatback frame such that a rotational motion of the at least one surface element and of the at least one elastic impact absorber about the horizontal pivot axis is achieved opposite to and in a direction of travel.

4. A backrest part for a vehicle seat comprising:
   a seatback frame; and
   an upper seatback adjustment device arranged in the seatback frame, the upper seatback adjustment device facilitating continuous adjustment in an upper region of the backrest part;
   the upper seatback adjustment device having at least one surface element that is movably mounted in the seatback frame and at least one elastic impact absorber integrated into the at least one surface element, the at least one surface element and the at least one elastic impact absorber being arranged so as to be jointly adjustable opposite to and in a direction of travel with respect to a top section of the seatback frame,
   wherein the at least one surface element and the at least one elastic impact absorber are arranged in a common surface-element-and-impact plane,
   wherein the at least one surface element is mounted in mounting points in the seatback frame such that a rotational motion of the at least one surface element and of the at least one elastic impact absorber about a horizontal pivot axis is achieved opposite to and in a direction of travel, and
   wherein the horizontal pivot axis is located at a bottom edge of the at least one surface element.

5. The backrest part according to claim 1, wherein the at least one surface element forms a contact surface that is brought towards the shoulder region of a back surface of a back region of a seated person by the continuous adjustment of the at least one surface element opposite the direction of travel.

6. The backrest part according to claim 1, wherein the at least one elastic impact absorber forms a contact surface that is brought toward a neck and the upper back surface of the back region of the seated person by the continuous adjustment of the at least one surface element opposite the direction of travel.

7. The backrest part according to claim 1, wherein two of the at least one surface element are provided and are arranged relative to a vertical longitudinal center axis of the backrest part to be axially symmetrical on the left and right of the longitudinal center axis.

8. The backrest part according to claim 1, wherein the at least one elastic impact absorber is a wire mesh mat.

9. The backrest part according to claim 8, wherein the wire mesh mat is integrated into the at least one surface element.

10. The backrest part according to claim 8, wherein the wire mesh mat is arranged to be integrated between two of the at least one surface element.

11. A backrest part for a vehicle seat comprising:
    a seatback frame; and
    an upper seatback adjustment device arranged in the seatback frame, the upper seatback adjustment device facilitating continuous adjustment in an upper region of the backrest part;
    the upper seatback adjustment device having at least one surface element that is movably mounted in the seatback frame and at least one elastic impact absorber integrated into the at least one surface element, the at least one surface element and the at least one elastic impact absorber being arranged so as to be jointly adjustable opposite to and in a direction of travel with respect to a top section of the seatback frame,
    wherein the at least one surface element and the at least one elastic impact absorber are arranged in a common surface-element-and-impact plane,
    wherein the at least one elastic impact absorber is a wire mesh mat,
    wherein the wire mesh mat is arranged to be integrated between two of the at least one surface element, and
    wherein the two of the at least one surface element are connected by rocker arms to a connecting element that is arranged in a connecting element plane that is parallel to an impact plane of the at least one elastic impact absorber, and the connecting element being arranged between the top section and the at least one impact absorber.

12. The backrest part according to claim 11, wherein the adjustment opposite to and in the direction of travel is accomplished manually or electromechanically or pneumatically via at least one adjuster that is associated with the upper seatback adjustment device and that acts on the at least one surface element and/or the connecting element.

13. The backrest part according to claim 7, wherein outer side surfaces of the two of the at least one surface element are directly attached to the seatback frame at the mounting points.

14. The backrest part according to claim 1, wherein the at least one elastic impact absorber is integrated into an inner side surface of the at least one surface element.

15. The backrest part according to claim 11, wherein the rocker arms are each formed by curved sheet metal strips and the connecting element is formed of a flat sheet metal part.

\* \* \* \* \*